United States Patent [19]

Halford

[11] Patent Number: 5,283,791
[45] Date of Patent: Feb. 1, 1994

[54] ERROR RECOVERY METHOD AND APPARATUS FOR HIGH PERFORMANCE DISK DRIVES

[75] Inventor: Robert J. Halford, Chippewa Falls, Wis.

[73] Assignee: Cray Research Systems, Inc., Minneapolis, Minn.

[21] Appl. No.: 33,423

[22] Filed: Mar. 18, 1993

Related U.S. Application Data

[63] Continuation of Ser. No. 555,927, Jul. 19, 1990, abandoned, which is a continuation-in-part of Ser. No. 382,437, Jul. 19, 1989, which is a continuation-in-part of Ser. No. 227,367, Aug. 2, 1988.

[51] Int. Cl.$^5$ .................................... H03M 13/00
[52] U.S. Cl. ............................ 371/40.4; 371/40.1; 360/39
[58] Field of Search ............... 371/40.1, 40.2, 40.4, 371/37.4, 37.7, 38.1, 39.1, 51.1, 10.1; 360/39; 364/200 MS

[56] References Cited

U.S. PATENT DOCUMENTS

| | | | |
|---|---|---|---|
| Re. 28,923 | 8/1986 | Patel | 371/40.1 |
| Re. 30,187 | 1/1980 | Hong et al. | 371/37.1 |
| 3,274,561 | 9/1966 | Hallman | 395/275 |
| 3,290,654 | 11/1966 | Rettig et al. | 395/500 |
| 3,432,813 | 3/1969 | Annunziata et al. | 395/275 |
| 3,623,155 | 11/1971 | Hsiao et al. | 371/37.1 |
| 3,699,524 | 10/1972 | Norberg | 340/825.5 |
| 3,725,864 | 4/1973 | Clark et al. | 395/275 |
| 3,868,632 | 2/1975 | Hong et al. | 371/37.1 |
| 3,876,978 | 4/1975 | Bossen et al. | 371/51.1 |
| 3,913,068 | 10/1975 | Patel | 371/40.1 |
| 3,955,180 | 5/1976 | Hirtle | 395/500 |
| 4,052,698 | 10/1977 | Ragle | 371/37.6 |
| 4,087,794 | 5/1978 | Beausoleil et al. | 395/500 |
| 4,201,976 | 5/1980 | Patel | 371/50.1 |
| 4,205,324 | 5/1980 | Patel | 371/50.1 |
| 4,211,997 | 7/1980 | Rudnick et al. | 371/40.1 |
| 4,257,074 | 3/1981 | Goss | 360/78.06 |
| 4,322,793 | 3/1982 | Andersson et al. | 395/325 |

(List continued on next page.)

FOREIGN PATENT DOCUMENTS

| | | |
|---|---|---|
| 1227880 | of 0000 | Canada . |
| 1228677 | of 0000 | Canada . |
| 81961 | of 0000 | European Pat. Off. . |
| 156724 | of 0000 | European Pat. Off. . |
| 0165914 | of 0000 | European Pat. Off. . |

(List continued on next page.)

OTHER PUBLICATIONS

*IEEE Computer*, Aug. 1988, pp. 26–38 L. Tucker, "Architecture and Applications of the Connection Machine".

(List continued on next page.)

*Primary Examiner*—Robert W. Beausoliel, Jr.
*Assistant Examiner*—Ly V. Hua
*Attorney, Agent, or Firm*—Merchant, Gould, Smith, Edell, Welter & Schmidt

[57] ABSTRACT

The present invention discloses an error recovery method for parallel architecture data storage devices. The present invention provides means for simultaneously arranging data on a plurality of recording surfaces so that intermittent and/or solid failures do not prevent access to the data stored thereon. A first error correcting code comprising a parity bit is generated for each dataword. The dataword and the parity bit are stored simultaneously and bit-wise to a plurality of recording surfaces. A second error correcting code is generated for a plurality of bits transmitted to a specific recording surface. The second error correcting code is written onto the same recording surface as the bits from which it was generated. The second error correcting code is used to detect and correct intermittent errors in the data read from a particular recording surface. The first error correcting code is used to correct data read from a particular surface when the second error correcting code indicates that a solid failure has occurred, which the second error correcting code cannot correct. The result is a data storage device combining large capacity and fast transfer rates with improved fault tolerance.

9 Claims, 5 Drawing Sheets

U.S. PATENT DOCUMENTS

| | | | |
|---|---|---|---|
| 4,359,772 | 11/1982 | Patel | 371/38.1 |
| 4,399,503 | 8/1983 | Hawley | 395/325 |
| 4,413,251 | 11/1983 | Adler et al. | 340/347 DD |
| 4,430,712 | 2/1984 | Coulson et al. | 364/200 |
| 4,453,211 | 6/1984 | Askinazi et al. | 395/500 |
| 4,467,373 | 8/1984 | Taylor et al. | 371/40.1 |
| 4,467,421 | 8/1984 | White | 364/200 |
| 4,476,526 | 10/1984 | Dodd | 364/200 |
| 4,476,527 | 10/1984 | Clayton | 364/200 |
| 4,490,782 | 12/1984 | Dixon et al. | 364/200 |
| 4,490,786 | 12/1984 | Nakatani | 364/200 |
| 4,509,122 | 4/1985 | Agnew et al. | 395/500 |
| 4,511,963 | 4/1985 | Kantner | 395/500 |
| 4,523,275 | 6/1985 | Swenson et al. | 364/200 |
| 4,525,838 | 6/1985 | Patel | 371/40.1 |
| 4,590,559 | 5/1986 | Baldwin et al. | 364/414 |
| 4,607,328 | 8/1986 | Furukawa et al. | 395/250 |
| 4,630,230 | 12/1986 | Sundet | 395/425 |
| 4,642,759 | 2/1987 | Foster | 395/500 |
| 4,701,848 | 10/1987 | Clyde | 395/325 |
| 4,722,085 | 1/1988 | Flora et al. | 371/40.1 |
| 4,761,785 | 8/1988 | Clark et al. | 371/51.1 |
| 4,771,378 | 9/1988 | Halford | 364/200 |
| 4,791,641 | 12/1988 | Hillis | 371/37.6 |
| 4,797,755 | 1/1989 | Baldwin et al. | 360/49 |
| 4,805,173 | 2/1989 | Hillis et al. | 371/40.1 |
| 4,807,121 | 2/1989 | Halford | 364/200 |
| 4,817,035 | 3/1989 | Timsit | 364/900 |
| 4,843,288 | 6/1989 | Volz et al. | 318/599 |
| 4,849,929 | 7/1989 | Timsit | 364/900 |
| 4,849,978 | 7/1989 | Dishon et al. | 371/51 |
| 4,862,462 | 8/1989 | Zulian | 371/40.1 |
| 4,870,643 | 9/1989 | Bultman et al. | 371/11.1 |
| 4,899,342 | 2/1990 | Potter et al. | 371/10.1 |
| 4,914,656 | 4/1990 | Dunphy, Jr. et al. | 371/10.2 |
| 4,942,579 | 7/1990 | Goodlander et al. | 371/51.1 |
| 4,958,351 | 9/1990 | Flora et al. | 371/51.1 |
| 4,989,206 | 1/1991 | Dunphy, Jr. et al. | 371/10.1 |
| 5,088,081 | 2/1992 | Farr | 369/54 |
| 5,128,810 | 7/1992 | Halford | 360/39 |

FOREIGN PATENT DOCUMENTS

| | | | |
|---|---|---|---|
| 165914 | of 0000 | European Pat. Off. | |
| 0201330 | of 0000 | European Pat. Off. | G11B 10/18 |
| 0242121 | of 0000 | European Pat. Off. | |
| 0320107 | of 0000 | European Pat. Off. | G06F 11/10 |
| 147055 | 7/1985 | European Pat. Off. | |
| 0278134 | 8/1988 | European Pat. Off. | |
| 0294287 | 12/1988 | European Pat. Off. | |
| 3633165A1 | 4/1987 | Fed. Rep. of Germany . | |
| 197664 | of 0000 | Japan . | |
| 57-197664 | 12/1982 | Japan . | |
| 63-223822 | 9/1988 | Japan . | |

OTHER PUBLICATIONS

*The Cray-2 Engineering Maintenance Manual, CMM 0200000*, Cray Research, Inc., Dec. 1987, pp. 3-18 through 3-19.

*Connection Machine® Model CM-2 Technical Summary*, Thinking Machines Corp. Apr. 1987.

*Ampex Scorpio Disk Storage Drive, Models 48 and 80, Product Description*, Ampex Corp., Sep. 1981.

*Centaurus Parallel Transfer Disk Drives Series*, Ampex Corp., May 1985 pp. 37, 38, 65 and 66.

*Centaurus Parallel Transfer Disk Subsystems*, Ampex Corp., Sep. 1987.

*Centaurus Winchester Parallel Disk Drive*, Ampex Corp., 1987.

Engineering Specification 64402900, Revision 1, Magnetic Peripherals, Inc., Sep. 28, 1988.

Intelligent Peripheral Interface-Physical Level, Oct. 23, 1983.

Intelligent Peripheral Interface Logical Level Three for Intelligent I/O, Dec. 23, 1983.

IPI Level Two Disk Interface Preliminary Draft, Jan. 6, 1984.

Preliminary ANSI Working Document No. X3T9, Mar. 1987-011, Revision 1.6, Mar. 9, 1988.

Sabre 2HP Eight-Inch Disk Drive, Imprimis, 1988.

*Electronic Engineering Times*, Jun. 6, 1988, pp. 73-74.

*DF880/DF848 Banjo Fixed Disk Drives*, Apex Engineering Specification, Aug. 19, 1981.

*Arrayed Disc Subsystem*, Seagate Technology, Nov. 1988.

ERROR RECOVERY METHOD AND APPARATUS FOR HIGH PERFORMANCE DISK DRIVES

CROSS REFERENCE TO RELATED APPLICATIONS

This is a continuation of application Ser. No. 07/555,927, filed Jul. 19, 1990, now abandoned, which is a continuation-in-part of application Ser. No. 07/382,437 filed Jul. 19, 1989 which application is a continuation-in-part of application Ser. No. 07/227,367 filed Aug. 2, 1988. Applications Ser. No. 07/382,437 and Ser. No. 07/227,367 are incorporated herein by reference.

BACKGROUND OF THE INVENTION

1. Field Of The Invention

This invention relates generally to data storage devices for computer systems. In particular, the present invention provides an error recovery method for parallel architecture data storage devices.

2. Description Of Related Art

Disk drives have long been popular mass storage devices. They provide a low cost solution to the problem of non-volatile data storage. Virtually all computer system manufacturers, therefore, provide for disk drives as system peripherals.

The major advantage of disk drives is low cost. This advantage is outweighed for some applications by the disadvantage of insufficient data transfer speed, particularly in supercomputer environments of the type provided by Cray Research, Inc., the Assignee of the present invention. The problems facing a computer system user wishing to increase the data transfer rates of disk drives are not trivial.

The basic structure of the disk drive consists of a metal disk coated with magnetic material rotating under one or more read/write heads. Most disk drives are multi-platen systems where a number of the metal disks are arranged in a stack.

All data transfers to disk drives are sequential in the sense that data moved in or out sequentially one word at a time. The access time to a selected word is partially dependent on its location. Data is recorded on the disk in concentric circles called "tracks". The disk drive has detection means for indicating when the magnetic head is positioned at the outermost track. A motor controls the head position causing the head to step from track to track. This head positioning function is called a "seek". The period required to position the Read/Write heads from the time the command is received until the time the drive becomes ready is known as the seek time.

Once a track is selected, it is necessary to wait for the desired location to rotate into position under the head. The average waiting time, known as latency time, is the time for half a revolution.

Within each track, information is organized into segments called "sectors". A sector can consist of any number of bytes, limited only by the storage capacity of the track. The addressing of sectors is typically a software function. So that the sectors can be identified by the software, each sector is preceded by an identifier block. The format of this identifier block is system dependent.

Usually each track is single bit serial, so that each byte is stored as eight consecutive bits on a track. Because track selection and latency increase access times, it is preferable to transfer large blocks of data which will be sorted in sequential locations. Once the disk heads are positioned at a particular track and no further head movement is required, data will be transferred at a fixed rate. This fixed rat is determined by the speed of the disk drive and is independent of the computer system itself.

Parallel architectures increase disk capacity and data transfer rates, but such architectures are more vulnerable to errors and the resultant corruption of data. If there are errors in these parallel architecture devices, then greater amounts of data may become inaccessible. Thus, the usefulness of parallel architecture data storage devices is limited by the fault tolerance of the device.

SUMMARY OF THE INVENTION

To overcome the limitations in the prior art discussed above, and to overcome other limitations readily recognizable to those skilled in the art, the present invention discloses an error recovery method for parallel architecture data storage devices. The present invention provides means for simultaneously arranging data on a plurality of recording surfaces so that errors cannot prevent access thereto. The result is data storage devices capable of high capacity, fast transfer rates, and improved fault tolerance.

In the present invention, a plurality of recording surfaces are provided for recording data. A first error correction code is generated for each dataword. The dataword is divided into a plurality of portions. Each of the portions and the first error correction code are stored on separate recording surfaces. A second error correction code is generated for a plurality of portions stored on a particular recording surface. The second error correction code is stored on the same recording surface as the portions. Errors can be identified and corrected using the first and second error correction codes in burst or recovery/re-read mode error correction.

Thus, a high performance method of storing and retrieving data is disclosed, which method can detect and correct errors due to defects in recording surfaces, Read/Write heads, circuitry, controllers, cables, and other faults.

BRIEF DESCRIPTION OF THE DRAWINGS

In the drawings, where like numerals refer to like elements throughout the several views.

DETAILED DESCRIPTION OF THE PREFERRED EMBODIMENT

In the following Detailed Description of both Preferred Embodiments, reference is made to the accompanying Drawings which form a part hereof, and in which is shown by way of illustration two specific embodiments in which the invention may be practiced. It is to be understood that other embodiments may be utilized and structural changes may be made without departing from the scope of the present invention.

FIRST PREFERRED EMBODIMENT

Figure 1:
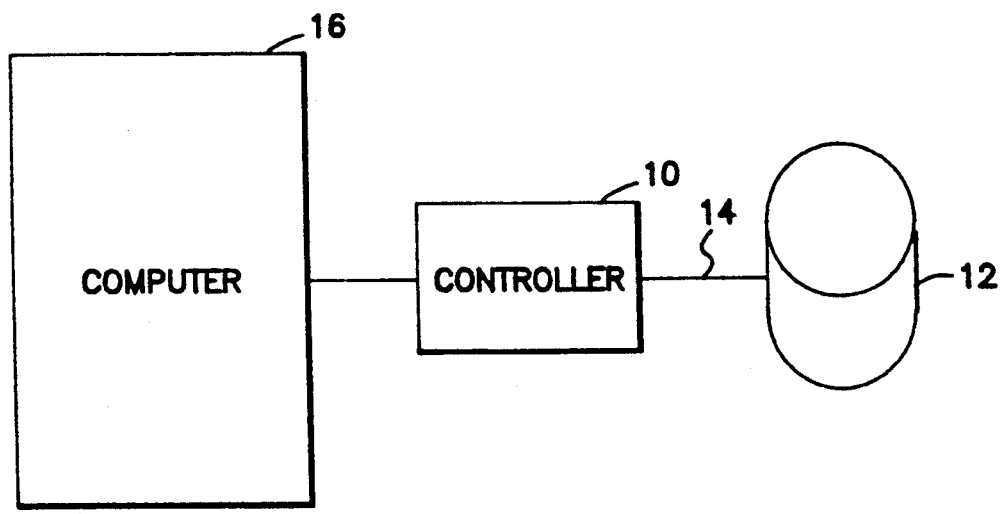
FIG. 1 is a block diagram describing the components of the data storage device in the first preferred embodiment of the present invention.

FIG. 1 describes the components of a computer system in the first preferred embodiment of the present invention. A computer 16 stores data on a secondary storage device, for example, disk drive 12. A controller 10 connected to both the computer 16 and the disk drive 12 directs the operations of the disk drive 12. The controller 10 and the disk drive 12 communicate across an interface 14.

In the first preferred embodiment, the interface 14 is a modification of the Intelligent Peripheral Interface (IPI) standard promulgated by the American National Standards Institute (ANSI). Alternative embodiments could use different interfaces between the controller 10 and the disk drive 12.

The IPI standard uses 8-bit data paths wherein a ninth bit position transmits a parity code for the 8 bits of data. Any number of 8-bit paths, and their associated parity codes, may be combined to create the interface 14. The parity code is generated at the transmitting end of the interface 14 and checked at the receiving end of the interface 14. Thus, the parity code provides limited error detection and correction for data transmitted across the interface 14. The disk drive 12, however, does not store the parity code.

In the first preferred embodiment, the interface 14 also uses a ninth bit position to transmit a parity code for each 8-bit byte of data. The controller 10 generates the parity code and the disk drive 12 stores it. Unlike the IPI standard, however, the interface 14 does not re-generate the parity code when reading data from the disk drive 12. Thus, the parity code provides detection means for any errors introduced by the disk drive 12 or the interface 14.

Preferably, the interface 14 of the preferred embodiment is switchable between the IPI standard and the implementation associated with the present invention.

The interface 14 provides a high performance, expandable I/O channel. For example, in the first preferred embodiment, the interface 14 is comprised of two 8-bit data paths providing a 16-bit wide interface 14. In accordance with the IPI standard, the width of the interface 14 can be expanded in increments of 8 data bits to achieve higher parallel transfer rates. The interface 14 can also operate in a data streaming mode of operation, wherein all paths operate unidirectionally to achieve the fastest possible data transfer rates across the interface 14.

Figure 2:
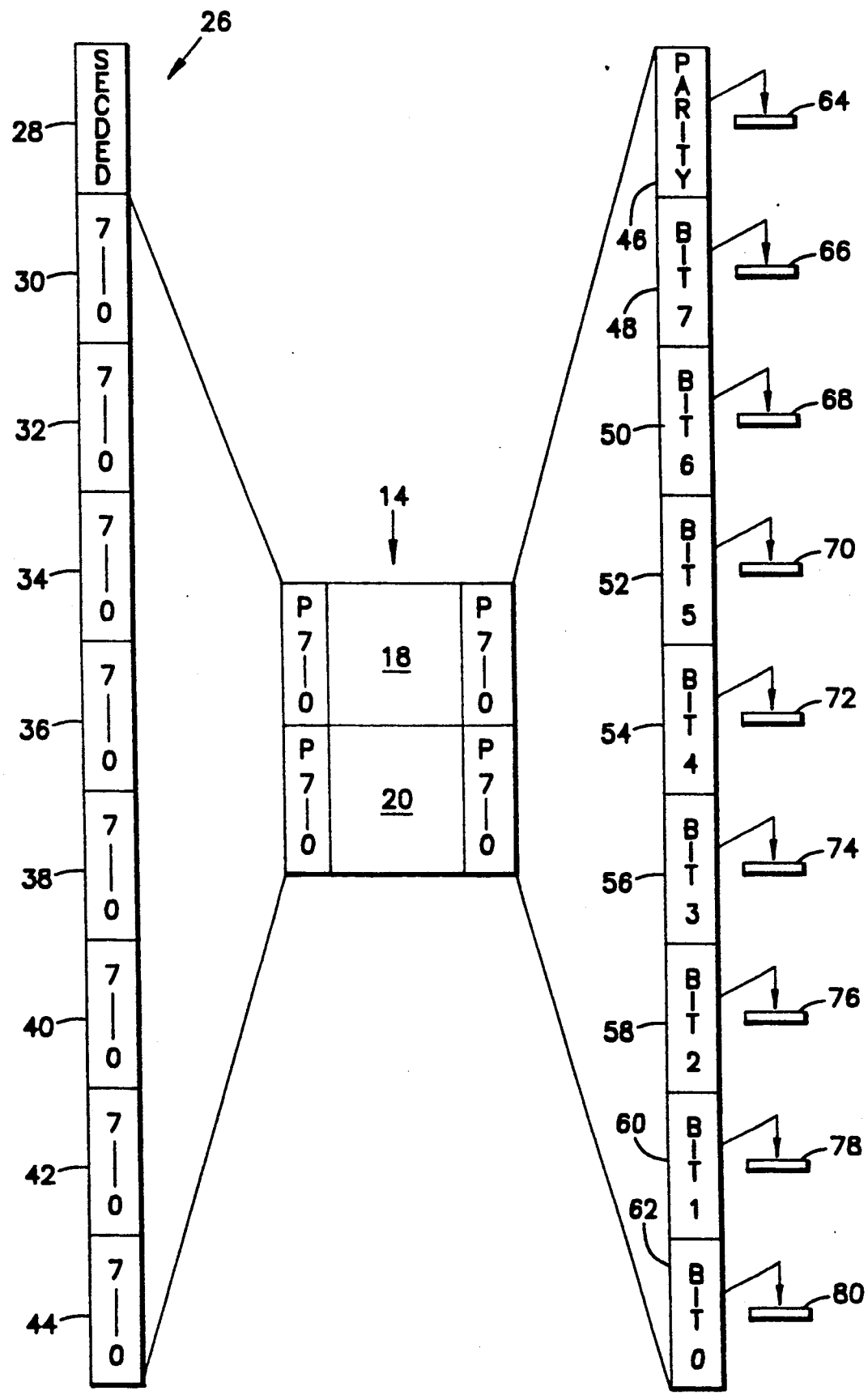
FIG. 2 is a block diagram describing the operation of the data storage device in the first preferred embodiment.

FIG. 2 describes the operation of the first preferred embodiment. The computer 16 preferably has a 64-bit word size. Associated with each 64-bit word 26 is an 8-bit SECDED (Single Error Correction, Double Error Detection) code 28. Preferably, the SECDED code 28 is not written to the disk drive 12 with the 64-bit word 26. Data is transferred to the disk drive 12 across interface 14 which is comprised of two data paths 18 and 20. Both paths 18 and 20 operate simultaneously in transferring 8 bits of data. The controller 10 identifies four 16-bit parcels, 30/32, 34/36, 38/40 and 42/44, within each 64-bit word 26. These parcels are transferred sequentially to the disk drive 12 across the interface 14. Both bytes of a parcel are transmitted on of the paths 18 and 20 simultaneously.

Simultaneously with the transfer of data, each path 18 and 20 transfers a first error correcting code. In the first preferred embodiment, the first error correcting code consists of a single parity bit. The controller 10 generates the parity bit. In FIG. 2, the data bits of each path 18 and 20 are labeled "0–7" and the parity bit is labeled "P".

The controller 10 also generates a second error correcting code for each 2048 bytes of data transferred in a specific bit position of the paths 18 and 20. In the first preferred embodiment, the second error correcting code is a 32-bit ECC or checksum code, which is placed in the last four bytes of each 2,052 byte sector stored on the disk drive 12.

When the disk drive 12 receives the data from the interface 14, it selects each path 18 or 20 in turn. Each of the nine bits from the selected path 18 or 20 are written by circuits 46–62 simultaneously and bit-wise onto one of nine different recording surfaces 64–80. Thus, the bits transferred in a specific bit position of each path 18 and 20 are stored on a specific recording surface 64–80.

When the controller 10 makes a read request, the parity bit and eight data bits are read by circuits 46–62 simultaneously and bit-wise from the nine recording surfaces 64–80. When two sets of nine bits have been read, one for each path 18 and 20, they are transmitted simultaneously through the interface 14 to the controller 10. A small amount of FIFO buffering is required at the disk drive 12 to hold the first set until the second set is formed.

Figure 3:
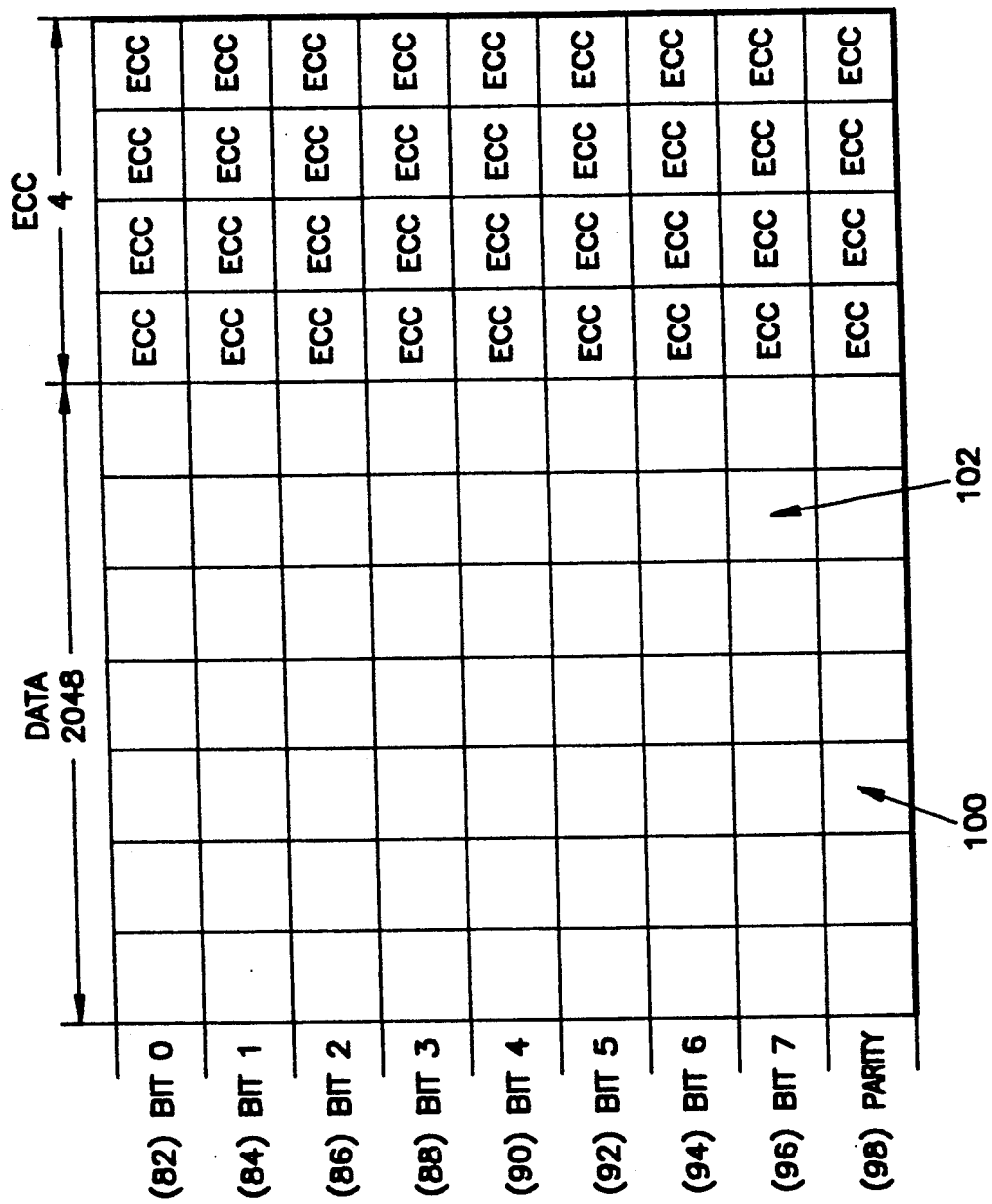
FIG. 3 is a block diagram describing the format of data on the data st device in the first preferred embodiment.

FIG. 3 illustrates the format of data stored on the disk drive 12 in the first preferred embodiment of the present invention. Each row in FIG. 3 represents one of the nine bits recorded by circuits 46–62 on surfaces 64–80 of the disk drive 12. Bits 82–96 are data bits; bit 98 is a parity bit. Each column in FIG. 3 represents a 8-bit byte of data stored within a sector. The first 2048 columns represent the data or the parity code. The last 4 columns represent the second error correcting code, the 32-bit ECC. (Note that for clarity 2,052 columns are not shown in FIG. 3). In the first preferred embodiment, the ECC is used to correct intermittent errors in the data and the parity bits are used to correct solid failures in the hardware.

For intermittent errors, the first preferred embodiment performs what is termed "burst mode error correction." The 25 controller 10 detects and corrects up to 8 data bits in error that are transferred in a particular bit position of the paths 18 and 20 using the second error correcting code (the ECC or checksum code). The ECC can correct up to eight bit errors. Preferably, the controller 10 has a buffer capable of storing data so that the error detection and correction process using the second error correcting code can take place in the buffer. Alternatively, the error detection and correction process using the second error correcting code can take place in the computer 16.

For solid failures, the first preferred embodiment performs what is termed "recovery/re-read mode error correction." A solid failure occurs if more than eight bits are in error. Normally, the parity bits 98 are not read. However, in recovery/re-read mode, the recording surface in error is re-read along with the parity bits 98. The recording surface in error is then corrected using the parity bits 98.

Thus, if data errors occur, because of defects in a recording surface, Read/Write head, Read/Write circuit, disk transceiver, controller transceiver, cable or other fault, the controller 10 can still recreate the data stored on the disk drive 12.

If multiple recording surfaces have intermittent errors, each recording surface can be corrected. However, if a solid failure occurs for more than one recording surface, the parity bits cannot correct the errors. Note that if two recording surfaces are in error, but only the first is a solid failure, i.e., the second has no more than eight bits in error, the data from the first recording surface can be corrected using the parity bits 98 and the data from the second recording surface can be correct using the ECC.

SECOND PREFERRED EMBODIMENT

Figure 4:
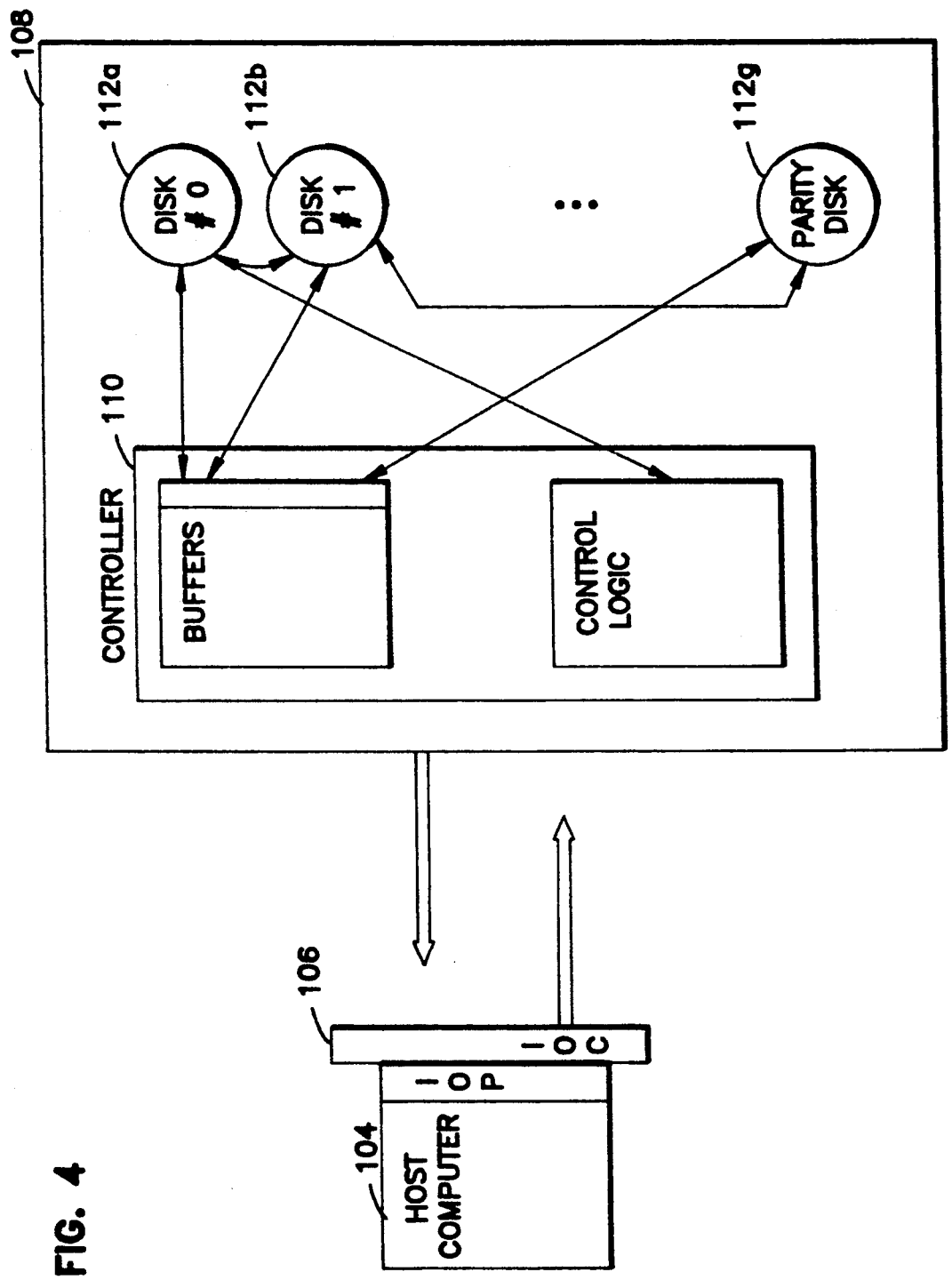
FIG. 4 is a block diagram illustrating an array of data storage devices used in the second preferred embodiment of the present and FIG. 5 shows the logical grouping of data on the disk array and its error detection and correction means in the second preferred embodiment.

FIG. 4 describes the components of a computer system in the second preferred embodiment of the present invention. A computer 104 communicates with a data storage subsystem 108 via an input/output channel 106. This communication includes both control information and data to be stored on the data storage subsystem 108. The data is transmitted in, for example, 16-bit-wide parcels from the computer 104. Each bit of the 16-bit-wide parcel, plus a parity bit, is stored in a simultaneous, parallel operation on one of 17 recording surfaces (i.e., disk drives) 112a–112g in array 112. This parallel operation results in a storage transfer rate that is 17 times faster than the standard architecture. Those skilled in the art will readily recognize that the recording surfaces could be separate disk drives, separate platters, etc.

The disk controller 110 broadcasts control signals to the array of data storage devices 112 simultaneously. This controller 110 provides an interface that appears to the computer 104 as a single data storage device, thereby providing transparent operation and compatibility with existing computer systems. The array of data storage devices 112 perform the same operations simultaneously.

Additional information on the architecture of this second preferred embodiment is available in the co-pending and commonly assigned patent application Ser. No. 07/227,367 entitled "SINGLE DISK EMULATION INTERFACE FOR AN ARRAY OF SYNCHRONOUS SPINDLE DISK DRIVES", which application is incorporated herein by reference.

Figure 5:
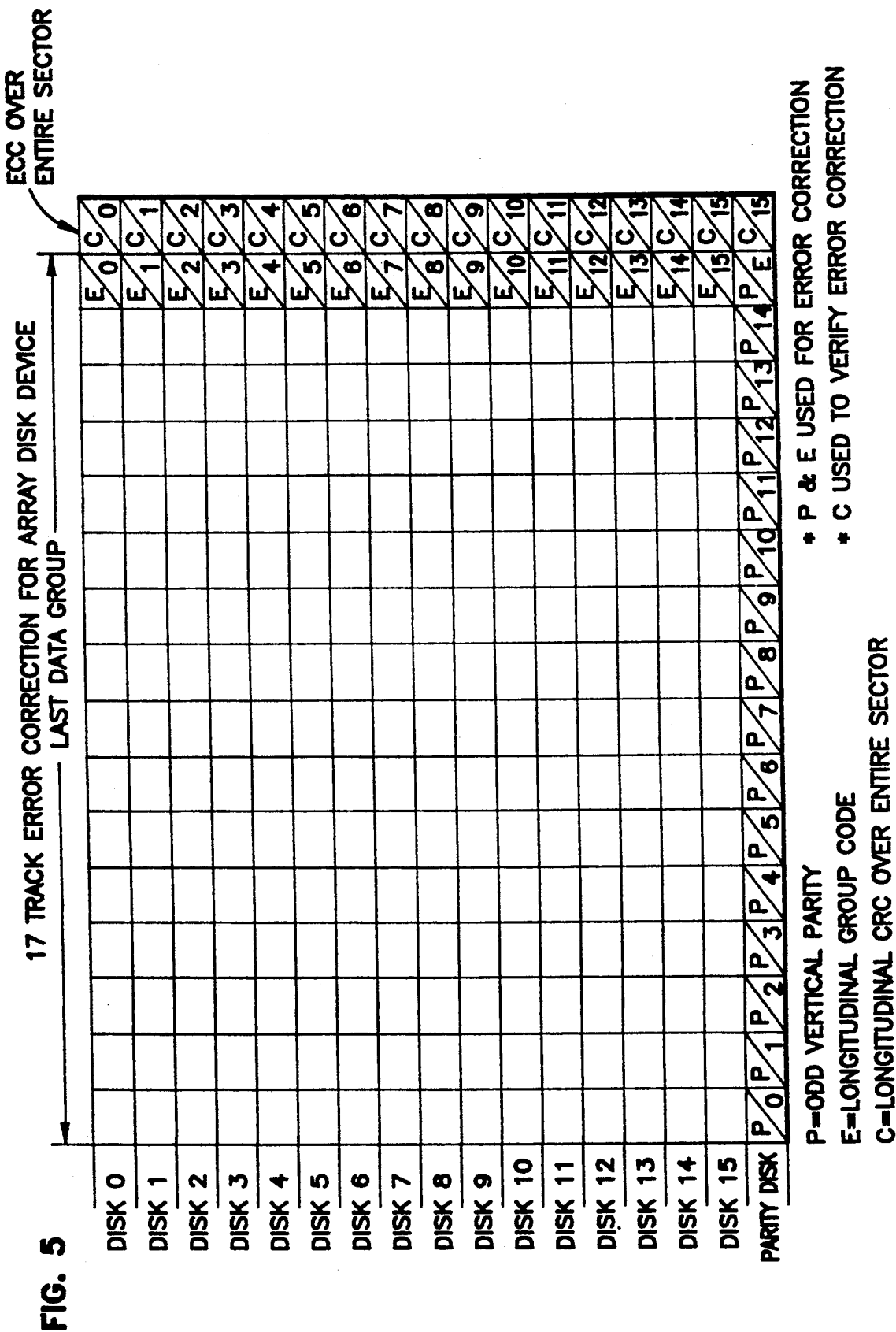

FIG. 5 describes how data is stored on the parallel data storage devices in the array 112. Each row (horizontal) represents bits stored on a single sector on a single track on a single data storage device. Each column (vertical) represents a 16-bit word transferred by the computer 104. Each bit is stored on a different data storage device. The parity bit on the seventeenth data storage device is generated by the disk controller 110 for error detection purposes. The data is logically grouped in 15-word segments. Each 15-word segment includes error detection and correction means labeled in FIG. 5 as bits $E_0$ through $E_{15}$. Each sector includes an additional word for redundant error correction and detection labeled in FIG. 5 as bits $C_0$ through $C_{15}$.

Using this storage method and using error detection and correction circuits for manipulating the Error Correction Code (ECC) bits $E_0$–$E_{15}$ in the disk controller 110, any data path in error to one of the data storage devices can be corrected for any 15-word segment. In FIG. 5, bits $P_0$ through $P_{15}$ are "vertical" parity bits. They contain the odd parity value for the column of bits. The bits labelled $E_0$ through $E_{15}$ in FIG. 5 are members of the ECC values for the block. The combination of ECC and parity check bits enables the identification and correction of all failing bits on any single disk drive within a 15-word segment. The row, or data storage device, in error can change every sixteen bits for the case of randomly detected unflagged media defects. As an additional check, an ECC, labeled in FIG. 5 as $C_0$ through $C_{15}$, is generated over an entire sector and stored as a vertical "word" immediately following the last group in the sector. This ECC will verify that the sector was repaired correctly.

Thus, the second preferred embodiment of the present invention provides a high degree of fault tolerance for a plurality of data storage devices, synchronized and controlled to emulate the operation of a single data storage device, through the use of parity bits and ECC parcels such that one data storage device within the array 112 can fail without interrupting the operation of data storage and retrieval.

CONCLUSION

Although two specific embodiments have been illustrated and described herein, it will be appreciated by those of ordinary skill in the art that any arrangement which is calculated to achieve the same purpose may be substituted for embodiments shown.

For example, an alternative to the first preferred embodiment need not be restricted to eight data bits, one parity bit, and nine parallel recording surfaces. Also, a larger number of data bits would enhance throughput, while a larger number of error detecting bits would permit the use of different error correcting techniques.

As another example, an alternative to the second preferred embodiment need not be restricted to sixteen data bits, one parity bit, and seventeen parallel data storage paths. Also, a larger number of data bits would enhance throughput, while a larger number of error detecting bits would permit the use of different error correcting techniques. In addition, the sector size used with the second preferred embodiment could also be readily changed.

This application is intended to cover any adaptations or variations of the present invention. Therefore, it is manifestly intended that this invention be limited only by the claims and the equivalents thereof.

What is claimed is:

1. A two-dimensional error detection and correction system for a multi-platen disk drive, comprising:
   input means for receiving a plurality of data words each having a plurality of data bits;
   a data storage device having a plurality of recording surfaces for storing data;
   write means operatively connected to said data storage device and said input means, for writing each of said data bits of each of said plurality of data words onto a different one of said plurality of recording surfaces such that the same bit position in said plurality of data words are written to the same recording surface;
   parity bit means, connected to receive said plurality of data words and operatively connected to said data storage device, for assigning a parity bit to each of said data words and for writing said parity bits of said data words to a single one of said recording surfaces, each of said parity bits being operable to enable single bit error correction within each of said data words; and error correction code means operatively connected to each of said recording surfaces of said data storage device, for assigning error correction codes to groupings of bits on each of said recording surfaces and for writing said error correction codes to each of said recording surfaces, said error correction codes being operable to enable multi-bit error correction within one of said groupings of bits on a single recording surface to which it is assigned.

2. The system of claim 1, further comprising means for reading said data words from said recording surfaces and for correcting intermittent errors in said data words stored on said recording surfaces using said error correction codes.

3. The system of claim 1, further comprising means for reading said data words from said recording surfaces and for correcting solid failures of said recording surfaces using said parity bits.

4. The system of claim 1, wherein said parity bit means and said error correction code means comprise a common controller coupled to said data storage device.

5. The system of claim 1 wherein said groupings of bits comprise a sector on the recording surface and said error correction codes comprise a 32-bit checksum calculated across the entire sector.

6. A two-dimensional error detection and correction system for synchronous disk drives, comprising:

input means for receiving a plurality of data words each having a plurality of data bits;

a plurality of synchronized-spindle data storage devices;

write means, operatively connected to said data storage device and said input means, for writing each bit of said data words onto a different one of said plurality of synchronized-spindle data storage devices such that the same bit position in of said data words are written to the same data storage device;

parity bit means, connected to receive said data words and operatively connected to said data storage device for assigning a parity bit to each of said data words and for writing parity bits of said data words to a single one of said data storage devices, each of said parity bits being operable to enable single bit error correction within each of said data words; and error correction code means, operatively connected to each of said recording surfaces of said data storage device, for assigning error correction codes to groupings of bits on each of said data storage devices and for writing said error correction codes to each of said data storage devices, said error correction codes being operable to enable multi-bit error correction within one of said groupings of bits on a single data storage device to which it is assigned.

7. The system of claim 6, wherein said party bit means and said error correction code means comprise a common controller coupled to each of said data storage devices.

8. The system of claim 6 wherein said groupings of bits comprise a sector on each of said data storage devices and said error correction codes comprise a 32-bit checksum calculated across the entire sector.

9. An error detection and correction system for a plurality of disk drives operating as a single storage device, comprising:

a plurality of disk drives;

input means for receiving a plurality of data words each having a plurality of data bits such that each bit position in a fixed number of said plurality of data words comprise a grouping of data bits;

control means connected to said input means and operable for receiving said data words and for assigning a parity bit to each of said data words such that the parity bits in said fixed number of said plurality of data words comprises a grouping of parity bits;

said control means further operable for assigning error correction codes to said groupings of data bits and said groupings of parity bits, said error correction codes being capable of detecting and correcting multi-bit errors within said grouping of bits;

said control means further connected to said plurality of disk drives for writing each bit of said data words onto a corresponding different one of said plurality of disk drives such that each of said grouping of data bits is serially written to each said corresponding different one of said plurality of disk drives;

said control means further operable for writing each parity bit of each of said data words onto a second different one of said plurality of disk drives such that said grouping of parity bits is serially written to said second different one of said plurality of disk drives;

said control means further operable for writing each error correction code corresponding to each of said grouping of data bits of each of said data words onto said corresponding different ones of said plurality of disk drives; and said control means further operable for writing each error correction code corresponding to each of said grouping of parity bits of each of said data words onto said second different ones of said plurality of disk drives.

* * * * *

UNITED STATES PATENT AND TRADEMARK OFFICE
CERTIFICATE OF CORRECTION

PATENT NO. :   5,283,791

DATED      :   February 1, 1994

INVENTOR(S) :  Robert J. Halford

It is certified that error appears in the above-identified patent and that said Letters Patent is hereby corrected as shown below:

Cover Page 2, Other Publications, second entry, after "Thinking Machines Corp." insert --,--.

Cover Page Two, Other Publications, penultimate entry, delete "Apex" and insert therefor --Ampex--.

Column 2, line 4, delete "rat" and insert therefor --rate--.

Column 2, line 65, delete "present and" and insert therefor --present invention; and--.

Column 4, line 55, delete "25".

Signed and Sealed this

Fourth Day of February, 1997

Attest:

BRUCE LEHMAN

*Attesting Officer*   *Commissioner of Patents and Trademarks*